Figure 1:
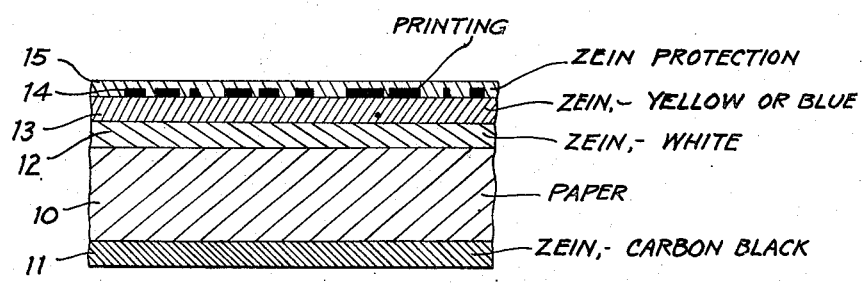

July 21, 1953  E. L. BAXTER  2,646,365

BACKING PAPER FOR ROLL PHOTOGRAPHIC FILM

Filed Sept. 27, 1950

ERNEST L. BAXTER
INVENTOR

ATTORNEYS

Patented July 21, 1953

2,646,365

UNITED STATES PATENT OFFICE 2,646,365

BACKING PAPER FOR ROLL PHOTOGRAPHIC FILM

Ernest L. Baxter, Rochester, N. Y., assignor to Eastman Kodak Company, Rochester, N. Y., a corporation of New Jersey Application September 27, 1950, Serial No. 187,124

2 Claims. (Cl. 117—14)

This invention relates to improvements in backing paper for roll photographic film, and more particularly relates to a backing paper, with protective light-colored and opaquing coatings thereon, which has appreciably less overall thickness than conventional backing papers, and which is superior in opaqueness and equal in other respects to presently employed backing paper.

As is well understood, a photographic roll film cartridge usually comprises a flanged spool upon which is wound a long strip of opaque backing paper to which is attached a strip of light sensitive film, the ends of the backing paper extending beyond the ends of the film and constituting light protective leader and trailer strips for the film which is interwound with the backing paper.

The film is attached to the black side of a duplex paper, the side opposite that contacting the film is differently colored and carries various printed symbols such as the number of the exposed areas, warning marks and advertising matter, over which is coated a protective layer intended to protect the sensitive emulsion from the paper and the ink employed in printing when the film and paper are interwound in close contact. It has been the practice to depend somewhat on the paper itself to prevent the transmission of light. To assure opaqueness, backing paper now employed for roll films generally consists of a duplex paper with one side black and the other side colored with a characteristic identifying color. The paper may be made by means of a Fourdrinier paper machine and a cylinder paper machine. The two sheets are brought together wet under the first press and thus form a single composite sheet of backing paper.

Any backing paper has certain definite specifications that must be met. The black side must be opaque and free of pinholes. The lighter colored side should be uniform in color and appearance and should not permit any of the black on the opposite side to be visible through the paper. The diameter of the finished spool of roll film, and therefore the number of exposures, is dependent on the overall thickness of the backing paper and the film, so thickness of the paper itself must be limited. The required strength of the paper which is important both in the camera and in processing also limits the thinness of the paper.

For maximum visibility of the exposure numbers through the camera windows, it is essential to have the greatest possible contrast between the backing paper and the printing on the paper. Either black numerals on a white paper or white numerals on a black paper give the greatest contrast, but neither paper is very pleasing to the eye. Lighter colored backgrounds such as shades of red, green, yellow and blue are more desirable from an appearance standpoint.

It does not appear possible for a paper mill to make a duplex backing paper thinner than those in current use which will fulfill the necessary requirements of such a paper. In order that the sheet may be photographically opaque, a certain minimum weight and thickness of black is required. The lighter the shade and color of the other side, the greater is the weight and thickness of paper required to hide the black side and to give the light colored side a uniform appearance. The present invention, however, provides a thinner backing paper of desirable characteristics.

An object, therefore, of the present invention is to provide a backing paper comprising a single sheet of paper, as contrasted to a duplex paper, which has a strength equal to the thinner duplex papers now produced.

Another object of the invention is to provide a single sheet coated backing paper which is not only thinner than present duplex paper, but has an opaqueness superior to duplex backing papers.

Another object of the invention is to provide a thin single sheet backing paper, the opacity of which is dependent primarily on the chemical coatings on the paper rather than the paper structure itself.

Still another object is to provide a backing paper having an improvement in overall thinness so that extra film exposures are permitted without increasing the diameter of the roll beyond that of the same type of presently employed roll film.

In accordance with the invention, these and other objects are attained by employing as the paper strip in the backing paper a single sheet, as contrasted to a duplex paper, which has been supercalendered to a thickness appreciably less than commonly employed duplex papers. By itself this paper is so thin that it tends to transmit actinic light. This thin paper is then coated on one side with a black opaque coating and on the other side by a composite coating of lighter colored composition. The paper may then be printed on the light-colored side and, if so printed, the printed side is given a protective overcoating to protect the film emulsion from the printing inks. The various coatings may be applied in proper sequence by a rotogravure process or from a solvent solution by other suitable coating processes. The coatings may be suitably dried between applications.

The paper preferably employed as the base of the backing paper is a black kraft paper of about 14 lb./M square feet which has been supercalendered to a thickness within the range 0.0026″–0.0030″ thickness. This paper is then coated on one side with a black coating and on the other side by a coating of white followed by an overcoating of yellow or light blue, as may be desired. The paper is then printed on the yellow or blue side and the printed side is given a protective overcoating of a prolamine to protect the film emulsion from the printing inks when the film and backing paper is rolled onto the film spool. The various coatings may be applied in proper sequence by a rotogravure process or other suitable coating process.

The various coatings may be uniformly applied by a rotogravure process such as is described in U. S. Patent 2,218,249 of October 15, 1940, or other suitable rotogravure processes. The various applications are made continuously and each coating is dried before the next is applied. The coating is applied to the paper by the intaglio roll which is rotatably mounted in a pan containing the coating solution. The surface of the roll is embossed providing a plurality of very minute cups which carry the solution, the excess solution being removed from the roll by a doctor blade. The solution in these various cups is then transferred or applied uniformly to the strip by pressing the strip firmly against the cups by means of a rubber pressure roll over which the strip is fed. Each of these deposits after being placed on the paper is merged into a continuous layer by means of a smoothing bar to provide a uniform coating over the entire paper surface. Each coating is preferably dried in heated air having a relative humidity of 6% at 170° F. before applying a second coating The following colored coating compositions are preferred for use in carrying out my invention:

| Composition | Black Coating | White Coating | Yellow Coating | Blue Coating |
|---|---|---|---|---|
| | Pounds | Pounds | Pounds | Pounds |
| Zein | 20.0 | 20 | 20 | 20 |
| Water | 4.0 | 4 | 4 | 4 |
| Alcohol: | | | | |
| Ethyl alcohol | 66.6 | 66.6 | 66.6 | 66.6 |
| Methy alcohol | 3.6 | 3.6 | 3.6 | 3.6 |
| Water alcohol | 5.8 | 5.8 | 5.8 | 5.8 |
| Paris black | 10.0 | | | |
| Titanox "RCHT" | | 70 | 36 | 70 |
| Medium chrome yellow | | | 30 | |
| Light orange | | | 4 | |
| PTA blue | | | | .10 |
| | 110 | 170 | 170 | 170.10 |

In the foregoing formulas Titanox "RCHT" represents a finely divided titanium dioxide pigment; medium chrome yellow is a finely divided metal chromate pigment; light orange is a finely divided metal chromate pigment, and PTA blue is a phosphotungstic lake with a blue dye precipitated therein. Zein is employed as the binder in these compositions since it will not fog or desensitize the photographic emulsion on the film.

It will be understood that if a yellow color is desired, the yellow coating composition will be employed, or if a blue color is desired, the blue coating composition will be employed, or in other words, the yellow or blue coating is employed to the exclusion of the other. Coatings of other colors may be employed if desired, e. g. red, green and so forth.

Suitable ink compositions for printing indicia by rotogravure processes on the backing paper are disclosed in my Patent Re. 21,268 of November 21, 1939. These inks comprise suitable coloring materials in a prolamine binder such as zein. Other suitable inks for printing on such backing papers are disclosed in my Patent 2,262,986 of November 18, 1941.

Figure 2:
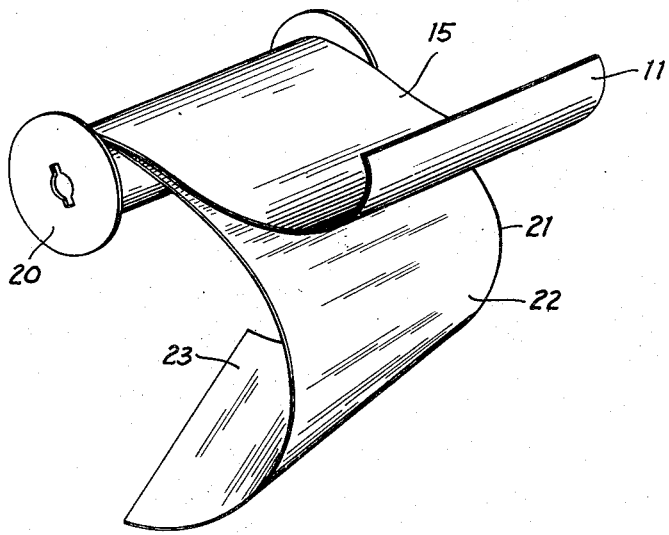

The invention will be further understood by reference to the drawings in which Fig. 1 represents a greatly enlarged cross-section of backing paper made in accordance with my present invention, and Fig. 2 shows the backing paper and photographic film wound on the roll with the film and paper separated at one end for purpose of illustration.

Referring to Fig. 1, a strip of black kraft paper is shown at 10 having a coating of a layer of carbon black in a zein binder thereon. On the opposite side of the paper, there is a white coating 12 comprising titanium dioxide in a zein binder, which is overcoated with a yellow coating 13 comprising orange and yellow pigment as well as titanium dioxide pigments. The printed indicia is shown at 14 overcoated with a protective zein coating 15.

Referring to Fig. 2, a film cartridge 20 is shown partly open in which the backing paper of the present invention is employed. This figure shows the relation of the backing paper surfaces 11 and 15 in respect to the film 21 when assembled on the spool. The emulsion side of the film is shown at 23 and the base side at 22.

While the preferred coating compositions are described above, satisfactory backing papers may be made by employing the various coating materials in the following ranges:

| Compositions | Preferred Range |
|---|---|
| | Percent |
| Zein | 7 to 25 |
| Black pigment | 1 to 15 |
| White pigment | 15 to 45 |
| Yellow pigment | 15 to 45 |
| Blue pigment | 15 to 45 |
| Solvent: | |
| Water | 5 to 20 |
| Ethy alcohol [1] | 95 to 80 |

[1] Iso propyl alcohol may be used in place of ethyl alcohol.

Other solvent compositions useful with zein:

Per cent
Ethyl alcohol 95% _____ 55
Ethylene chloride _____ 45 or

Ethyl alcohol 95% _____ 80
Methyl ethyl ketone _____ 20

Ethyl cellulose may be substituted for zein in similar amounts.

Resins such as polystyrene and cellulose esters may also be used with suitable solvents for them.

Other useful pigments are, for example, Hansa Yellow, Fast Pigment Yellow and any carbon black of suitable dispersion.

Other photographically inert pigments may be used. In fact, any choice of pigments for this invention is limited only by the requirement that they must be without detrimental effect on the photographic film.

Thickness of coating

Black composition is applied in the amount of 3 lbs. of solution per 1000 sq. ft. to give satisfactory opacity.

Light pigment composition is applied in the amount of 4¼ lbs. per sq. ft. to give satisfactory uniformity of color.

Any other type of paper may be used if it has good strength at least comparable to the present Duplex paper. A rag paper, for example, is suitable but, of course, expensive.

|  | Elmendorf Tear | | Schopper Folds | |
| --- | --- | --- | --- | --- |
|  | Along | Across | Along | Across |
| 1. A typical Duplex paper | gms. 78 | gms. 84 | 410 | 28 |
| 2. A typical Black Kraft (as used in the present invention) | 70 | 80 | 322 | 108 |

In general, the average tear strength of a suitable paper should be at least 50 gms. as determined by the Elmendorf tear test. This tear test is described in Paper Trade Journal for June 18, 1942, as Tappi Standard T414 M40.

While as above indicated, black kraft paper is particularly suited for employment in my invention, certain other types of black paper could be employed or paper of different colors such as yellow kraft paper, or a sulfite paper colored with a suitable dye such as Stilbene yellow in which a small amount of filler such as $TiO_2$ is added to give body and density or opacity to the paper. These papers are of a weight that can be super-calendered to a thinness that the paper itself plus the coatings thereon does not exceed a maximum thickness of 0.0040 inch. A 14 pound per M sq. ft. paper has been found satisfactory. A black coating of the following composition is then applied on one side of the yellow paper as by an air knife or doctor coater

|  | Pounds |
| --- | --- |
| Aquablak B | 14 |
| Polyvinyl alcohol | 10 |
| Water | 76 |

Aquablak B is a water dispersion of 35% carbon black in lignin sulphonate and made by Binney & Smith. The paper is dried, super-calendered until the thickness is below .0040 inch, printed on the yellow side and overcoated with a protective coating of zein which may be applied as are the coatings described previously.

The opacity of roll film backing paper is tested in the following manner.

A sheet of the backing paper under test is placed over a sheet of highly sensitive film, such as Super XX Panchromatic film with the black side of the backing paper in contact with the back of the film, duplicating its position on roll film. An orange red filter of the type used in camera back windows is placed over the opposite side of the backing paper and the assembly is placed in a printing frame. The test material is exposed to a light intensity of 5000 foot candles for ten minutes. The film is then processed in the usual way and examined for the presence of specks of developed silver. A satisfactory backing paper should show no visible silver image.

I have found that my improved backing paper has many advantageous features not possessed by duplex papers, which it may replace. The strength of the paper employed as the base of the backing paper is equal to the strength of the thinner duplex papers now available to the trade. The overall thickness can be made as low as 0.0032 up to 0.0040 inch thus permitting extra exposures to be added to present rolls of film without increasing the diameter beyond that of films now in use. The opaqueness, even though the overall thickness is less than backing papers now available in the trade, is better than such backing papers. The light colored identifying coating permits maximum contrast between printing on the backing paper and the light sheet of the background. This color contrast is pleasing to the eye, and the paper also has improved visibility when viewed through a camera window. In addition, less "clock-springing" of fresh film is found with the backing paper of the present invention than with the necessarily thicker duplex backing papers. The backing paper made in accordance with my invention requires the least amount of coating materials, both black and colored, of any of the methods described or known in the trade. This advantage plus the advantage of applying the coatings by rotogravure methods which are fast, accurate and efficient emphasize the importance of my present invention in this art.

What I claim and desire to secure by Letters Patent of the United States is:

1. Photographic backing paper comprising a single sheet of black kraft paper as contrasted to a multiple sheet duplex paper of a thickness within the range of 0.0026 to 0.0030 inch which will permit passage of substantial amounts of actinic light, having a coating on one surface of carbon black in a binder, a composite lighter colored coating on the opposite surface comprising a first coating of zein containing titanium dioxide and a second coating thereover comprising zein containing a yellow pigment, printing on said composite lighter colored coating, and a clear zein protective coating thereover, the complete backing paper having a thickness less than 0.0040 inch and being sufficiently opaque to prevent actinic light rays from passing therethrough.

2. Photographic backing paper comprising a single sheet of black kraft paper as contrasted to a multiple sheet duplex paper of a thickness within the range of 0.0026 to 0.0030 inch which will permit passage of substantial amounts of actinic light, having a coating on one surface of carbon black in a binder, a composite lighter colored coating on the opposite surface comprising a first coating of zein containing titanium dioxide and a second coating thereover comprising zein containing titanium dioxide, chrome yellow pigment and a light orange pigment, printing on said composite lighter colored coating, and a clear zein protective coating thereover, the complete backing paper having a thickness less than 0.0040 inch and being sufficiently opaque to prevent actinic light rays from passing therethrough.

ERNEST L. BAXTER.

References Cited in the file of this patent

UNITED STATES PATENTS

| Number | Name | Date |
| --- | --- | --- |
| 647,901 | McCurdy | Apr. 17, 1900 |
| 1,886,053 | Scannell | Nov. 1, 1932 |
| 1,954,333 | Sheppard et al. | Apr. 10, 1934 |
| 2,157,206 | Hinman | May 9, 1939 |
| 2,158,173 | Baxter | May 16, 1939 |
| 2,262,987 | Baxter | Nov. 18, 1941 |